(12) United States Patent
Kaplan

(10) Patent No.: US 8,039,993 B2
(45) Date of Patent: Oct. 18, 2011

(54) HIGH-VOLTAGE BUS DISCHARGE WITH LOGARITHMIC SELF-PROTECTION

(75) Inventor: Daniel J. Kaplan, Hawthorne, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 753 days.

(21) Appl. No.: 12/108,847

(22) Filed: Apr. 24, 2008

(65) Prior Publication Data
US 2009/0268354 A1    Oct. 29, 2009

(51) Int. Cl.
*G01F 1/08* (2006.01)
(52) U.S. Cl. .......................................... 307/98
(58) Field of Classification Search ............. 307/98; 315/205
See application file for complete search history.

(56) References Cited

U.S. PATENT DOCUMENTS

| | | | |
|---|---|---|---|
| 5,708,347 A | 1/1998 | Palanisamy et al. | |
| 5,804,973 A | 9/1998 | Shinohara et al. | |
| 6,002,221 A | 12/1999 | Ochiai et al. | |
| 6,437,575 B1 * | 8/2002 | Lin et al. | 324/433 |
| 6,452,416 B1 * | 9/2002 | Kaneda et al. | 324/765.01 |
| 6,577,024 B2 | 6/2003 | Kikuta et al. | |
| 7,375,985 B2 * | 5/2008 | Wai et al. | 363/17 |
| 7,723,949 B2 * | 5/2010 | Nakashima et al. | 320/107 |
| 7,764,067 B2 * | 7/2010 | Lindsey | 324/519 |
| 2007/0247115 A1 | 10/2007 | Ishikawa et al. | |

OTHER PUBLICATIONS

German Office Action dated Jul. 26, 2010, issued in Application No. 102009001032.

* cited by examiner

*Primary Examiner* — Albert W Paladini
(74) *Attorney, Agent, or Firm* — Ingrassia Fisher & Lorenz, P.C.

(57) ABSTRACT

Systems and methods for discharging a high-voltage bus coupled to a discharge circuit are provided. A method comprises obtaining a first voltage level of the high-voltage bus. The method further comprises determining a first discharge time based on the first voltage level and activating the discharge circuit. The method further comprises obtaining a second voltage level of the high-voltage bus after the first discharge time, comparing the first voltage level and the second voltage level, and deactivating the discharge circuit if a difference between the first voltage level and the second voltage level is less than a threshold value.

20 Claims, 4 Drawing Sheets

US 8,039,993 B2

HIGH-VOLTAGE BUS DISCHARGE WITH LOGARITHMIC SELF-PROTECTION

TECHNICAL FIELD

Embodiments of the subject matter described herein relate generally to electric and hybrid vehicle drive systems, and more particularly, embodiments of the subject matter relate to discharge circuits for high-voltage bus capacitance.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

In most hybrid vehicles, energy storage devices, such as capacitors, are often used to improve efficiency by capturing energy within the powertrain system or supplying additional power during periods of operation when a primary energy source cannot supply the required power quickly enough. For example, regenerative braking may be used to capture energy by converting kinetic energy to electrical energy and storing the electrical energy in a bank of capacitors for later use. In order to accommodate high-voltage operation within automobiles, capacitor banks or supercapacitors are often used because they have the ability to quickly store energy and can be discharged at a much higher rate than other energy sources.

However, capacitors may retain a charge long after power is removed from a circuit or an automobile is turned off. Therefore, high-voltage capacitors should be properly discharged after turning off a vehicle or before accessing the equipment housing the capacitors. Discharging a capacitor is typically accomplished by placing a discharge or bleed resistor across the capacitor or bus terminals in parallel.

In an automobile, there are possible fault conditions that may result in a constant voltage across the capacitor terminals. If a fault is not properly detected and protected against, attempting to discharge the capacitor will overheat and destroy the discharge resistor. Moreover, the failure of a discharge resistor prevents future discharge, resulting in voltage being retained on a capacitor or within the circuit for an extended period of time.

Previous discharge circuits and methods require unacceptably high average power dissipation in a discharge resistor during fault conditions and are not easily adaptable to higher voltage levels. These designs require discharge resistors with the ability to handle high average power dissipation. These resistors generally occupy a larger surface area and often require additional harnesses, connectors, and heat sinks, which prevent the discharge resistors from being built on a circuit board. In addition to the spatial requirements, these discharge circuits are adapted more for the less frequent fault mode, rather than a normal operating mode.

BRIEF SUMMARY

A method is provided for controlling a discharge circuit coupled to a high-voltage bus, wherein the discharge circuit is activated such that current flows from the high-voltage bus through the discharge circuit. The method comprises determining a first discharge time based on a first voltage level of the high-voltage bus, obtaining a second voltage level of the high-voltage bus after the first discharge time, and deactivating the discharge circuit if a difference between the first voltage level and the second voltage level is less than a threshold value.

A method is provided for discharging a high-voltage bus coupled to a discharge circuit. The method comprises obtaining a first voltage level of the high-voltage bus. The method further comprises determining a first discharge time based on the first voltage level and activating the discharge circuit. The method further comprises obtaining a second voltage level of the high-voltage bus after the first discharge time, comparing the first voltage level and the second voltage level, and deactivating the discharge circuit if a difference between the first voltage level and the second voltage level is less than a threshold value.

An apparatus for a vehicle protection system for a high-voltage capacitor bank coupled to a high-voltage bus is provided. The vehicle protection system comprises a discharge circuit coupled to the high-voltage bus and a discharge controller coupled to the high-voltage bus and the discharge circuit. The discharge controller is configured to activate the discharge circuit in response to a signal indicating the high-voltage bus should be discharged, determine a first discharge time based on a first voltage level of the high-voltage bus, obtain a second voltage level of the high-voltage bus after the first discharge time, and deactivate the discharge circuit if a difference between the first voltage level and the second voltage level of the high-voltage bus is less than a threshold value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Although the embodiments of the subject matter are discussed herein in the context of vehicle drive systems, the subject matter may apply to alternative implementations in other applications. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown depict one exemplary arrangement of elements, additional intervening elements, devices, features, or components may be present in an embodiment of the depicted subject matter.

Figure 1:
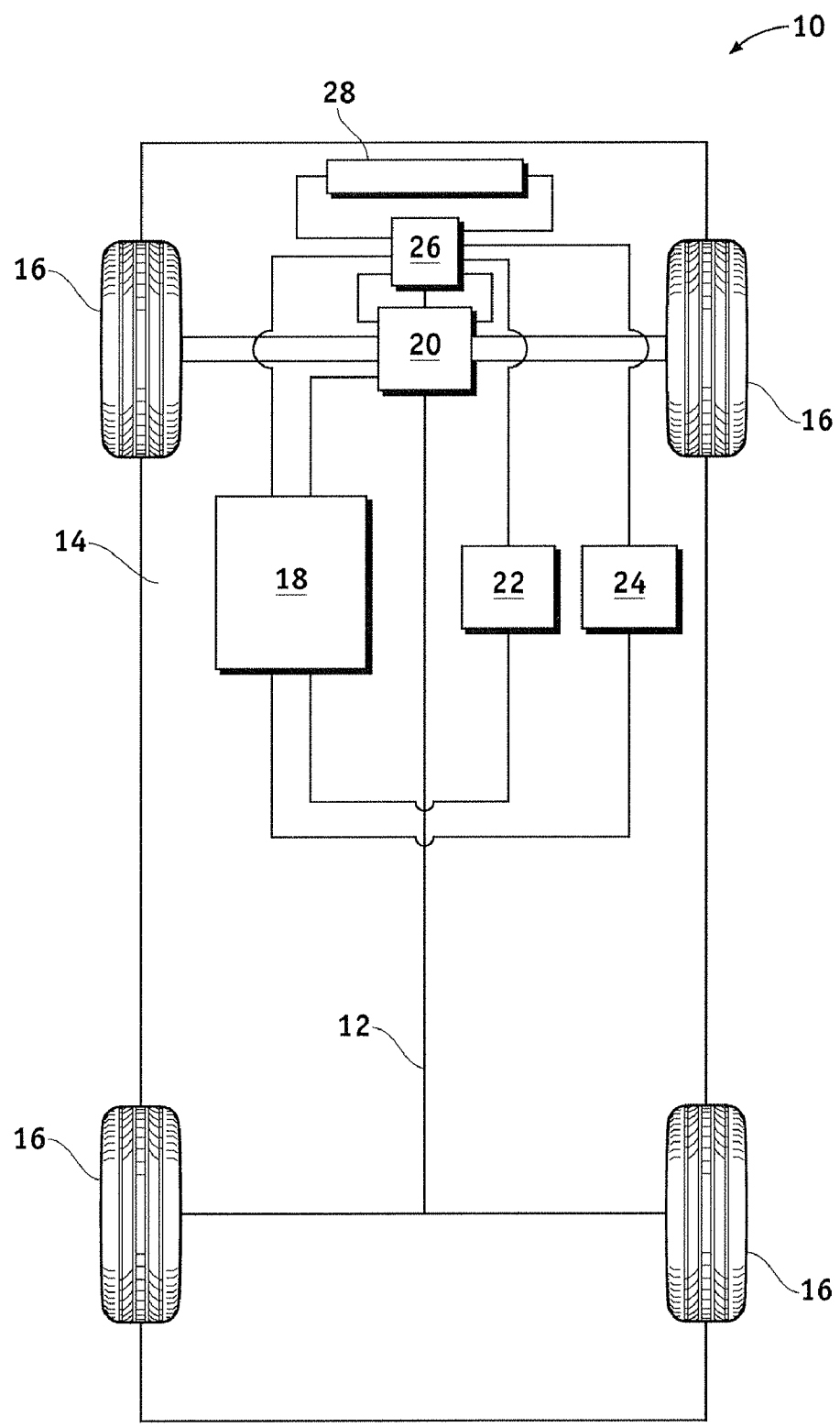
FIG. 1 is a block diagram of an exemplary automobile in accordance with one embodiment.

FIG. 1 illustrates an operative environment in a vehicle, or automobile 10, in accordance with one embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In an exemplary embodiment illustrated in FIG. 1, the automobile 10 is a hybrid vehicle, and may further include an electric motor/generator (or "traction" motor) 20, a first energy source 22, a second energy source 24, a power inverter assembly 26, and a radiator 28. As shown, the automobile 10 may comprise two energy sources 22, 24, although the subject matter discussed herein is not limited to a particular type of automobile 10, and the automobile 10 may instead utilize more or less than two energy sources 22, 24.

As shown in FIG. 1, the first energy source 22 and the second energy source 24 are in operable communication and/or electrically coupled to the electronic control system 18 and the power inverter assembly 26. Although not illustrated, the first energy source 22 and the second energy source 24 may vary depending on the embodiment and may be of the same or different type. In one or more embodiments, the first energy source 22 and second energy source 24 may each comprise a battery, a fuel cell, a capacitor bank, or another suitable voltage source. A battery may be any type of battery suitable for use in a desired application, such as a lead acid battery, a lithium-ion battery, a nickel-metal battery, or another rechargeable battery. A capacitor bank may comprise an ultracapacitor (or supercapacitor), an electrochemical double layer capacitor, or any other electrochemical capacitor with high energy density suitable for a desired application.

Figure 2:
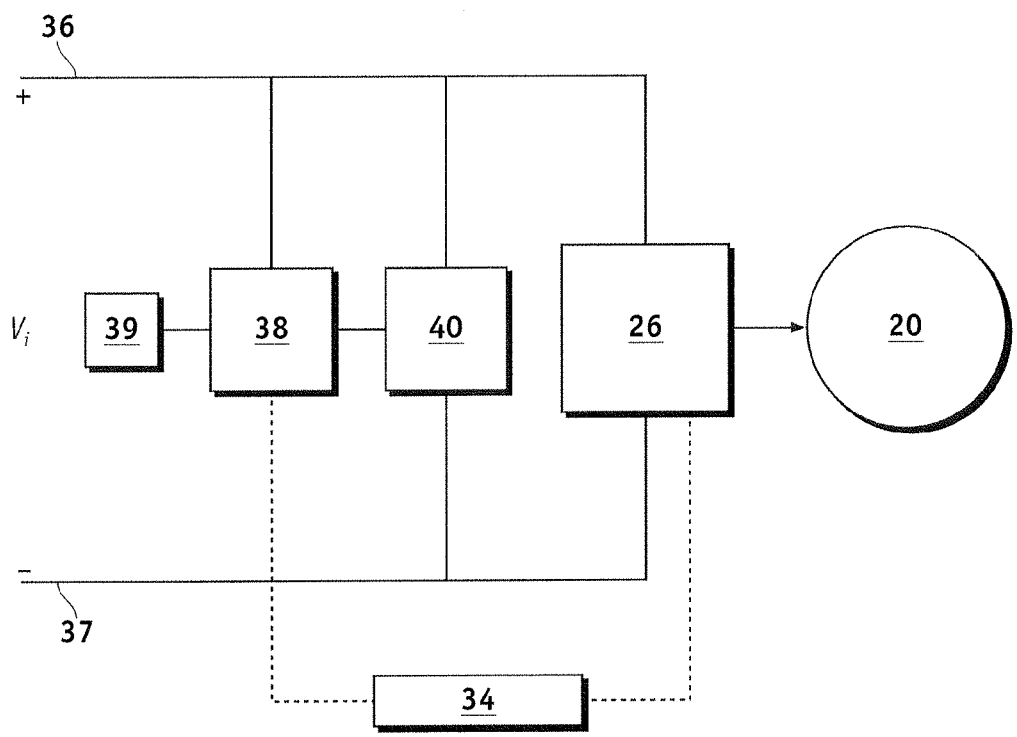
FIG. 2 is block diagram of a vehicle protection system in accordance with one embodiment.

Referring now to FIG. 2, the power inverter assembly 26 may be coupled to a high-voltage bus 36. The high-voltage bus 36 may be coupled to the first energy source 22, the second energy source 24, a capacitor bank, or any other suitable device containing stored energy (not shown). In an exemplary embodiment, a discharge controller 38 is coupled to the high-voltage bus 36 and a discharge circuit 40. The discharge circuit 40 is coupled to the high-voltage bus 36 and the reference ground 37. In an exemplary embodiment, a system controller 34 is in operable communication with and/or electrically coupled to the power inverter assembly 26 and the discharge controller 38.

In an exemplary embodiment, the discharge controller 38 is an 8-bit microcontroller, although other configurations are possible. For example, the discharge controller 38 could be embodied in a processor, or integrated into the system controller 34, the electronic control system 18, or another module. The discharge controller 38 may comprise a lookup table 39 in an exemplary embodiment. In other embodiments, the discharge controller 38 may include and/or be coupled to a database, flash memory, FPGA, or other hardware used for storing and/or correlating values. In an exemplary embodiment, the discharge circuit 40 and discharge controller 38 may be located on the circuit board within the power inverter assembly 26. In other embodiments, the discharge circuit 40 and discharge controller 38 may be located anywhere within the automobile 10 powertrain, inside or coupled to a power converter, or coupled to any other element containing stored energy.

Referring again to FIG. 1, the electronic control system 18 is in operable communication with the motor 20, the first energy source 22, the second energy source 24, and the power inverter assembly 26. Although not shown in detail, the electronic control system 18 may include various sensors and automotive control modules, or electronic control units (ECUs), such as an inverter control module (i.e., the system controller 34) and a vehicle controller. The system controller 34 is responsive to commands received from the driver of the automobile 10 (i.e., via the electronic control system 18) and provides commands to the power inverter assembly 26 to control the motor 20 and automobile 10 power train, as will be understood in the art.

Figure 3:
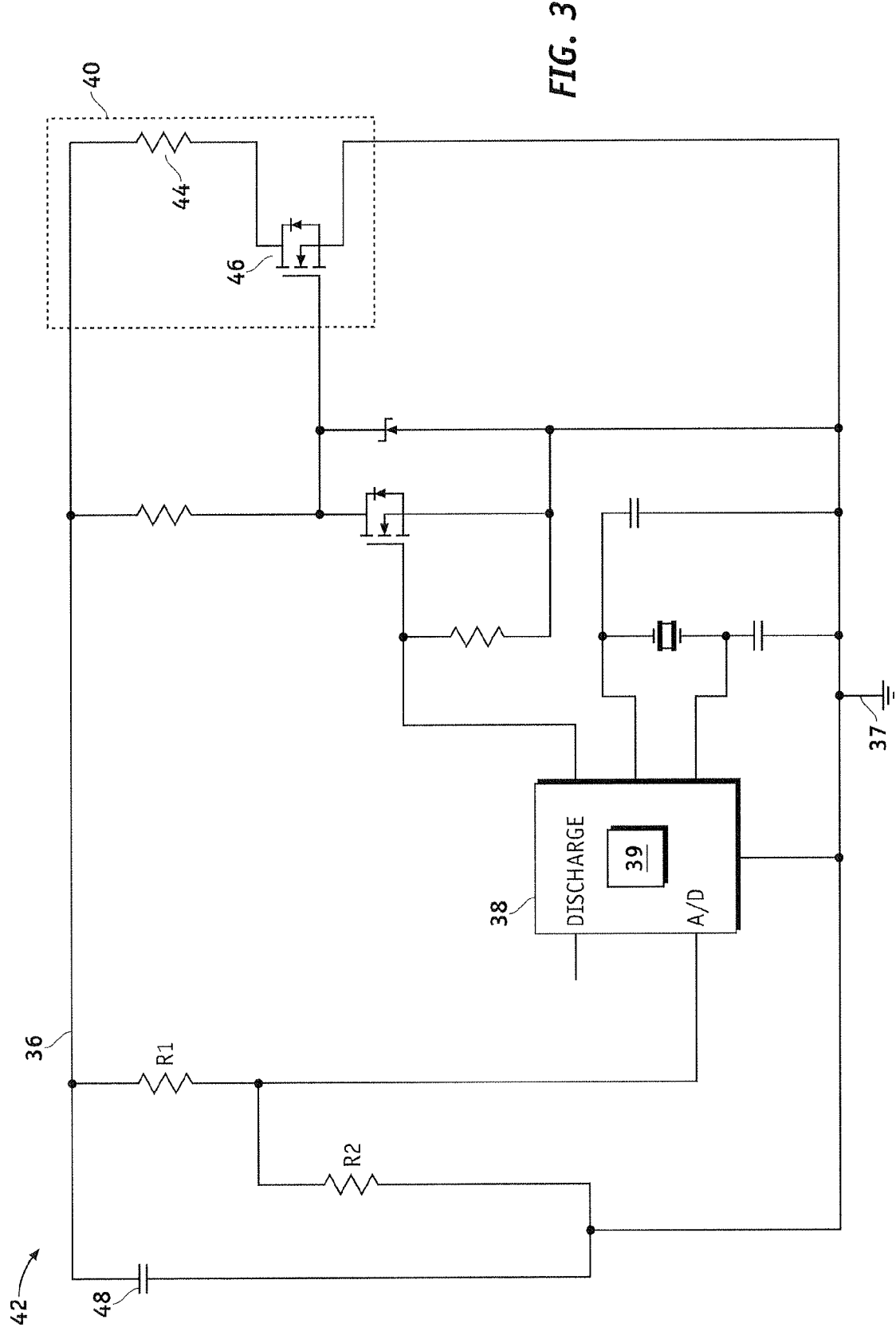
FIG. 3 is a schematic view of a vehicle protection system in accordance with one embodiment.

Referring now to FIG. 3, a vehicle protection system 42 in accordance with one embodiment is shown. The discharge circuit 40 further comprises a resistive element 44 and a switching element 46. As shown, in accordance with one embodiment, the resistive element 44 may be coupled between the high-voltage bus 36 and the switching element 46. In an exemplary embodiment, the resistive element 44 is a high-energy or pulse resistor capable of handling individual pulses of energy well. The switching element 46 is coupled to the discharge controller 38, such that the discharge controller 38 may be configured to activate the discharge circuit 40 by switching on the switching element 46 creating a path for current to flow from the high-voltage bus 36 through the discharge circuit 40. As shown in FIG. 3, the switching element 46 may preferably be realized as a MOSFET with a diode connected between its source and drain, although it will be appreciated in the art that alternative embodiments may employ any suitable switch configuration or equivalents thereof.

In an exemplary embodiment, a capacitor bank 48 is coupled to the high-voltage bus 36. The high-voltage bus 36 and/or the capacitor bank 48 may be connected to additional elements as will be understood in the art. The vehicle protection system 42 may include a voltage divider circuit (e.g., comprising R1, and R2 as shown) for the purposes of reducing the voltage level at the input to the discharge controller 38, as will be appreciated in the art.

Figure 4:
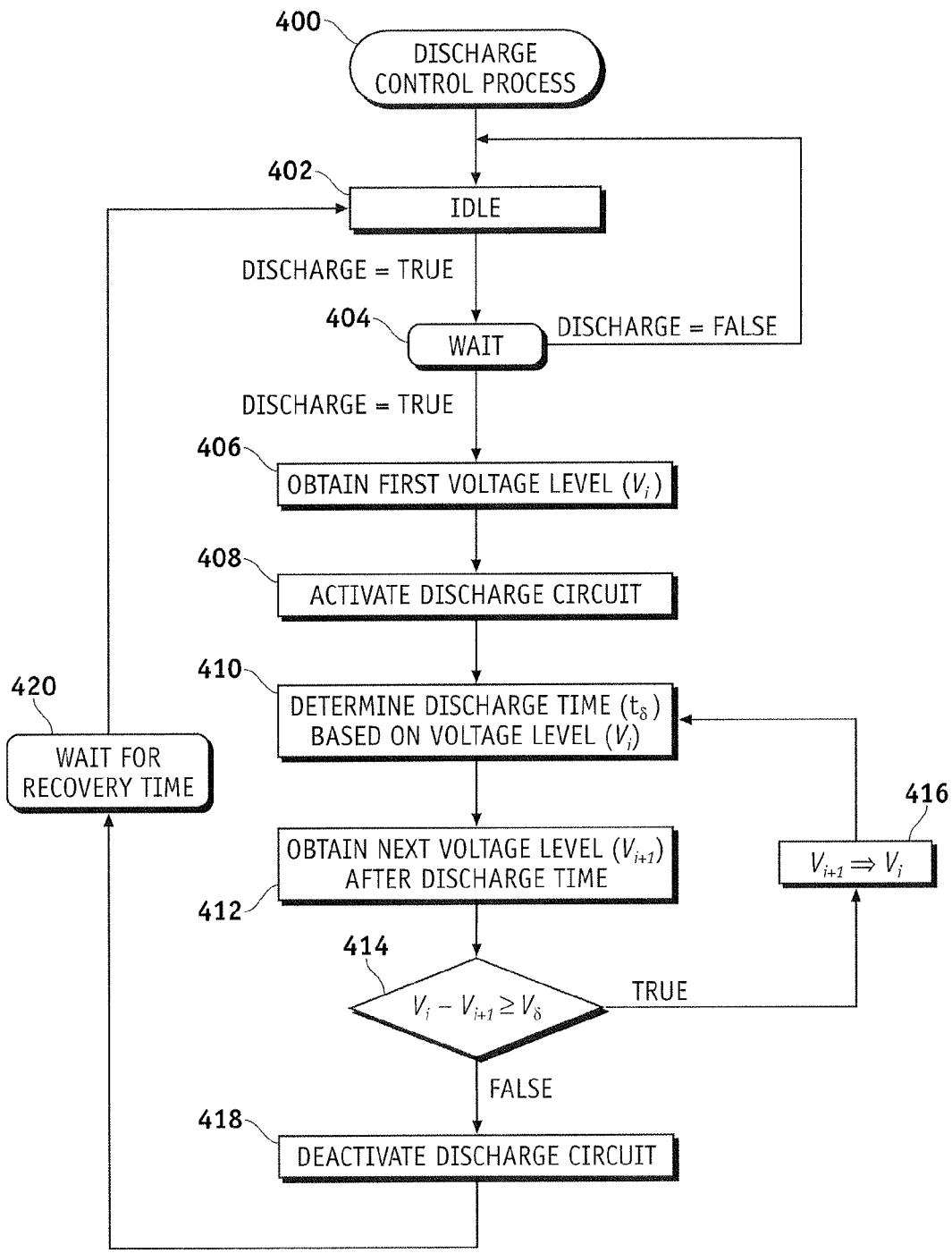
FIG. 4 is a flow diagram of a method for controlling a discharge circuit in accordance with one embodiment.

Referring to FIG. 4, in an exemplary embodiment, the discharge controller 38 may be designed to perform a discharge control process 400 and the tasks, functions, and operations described below. The various tasks performed in connection with the discharge control process 400 may be performed by software, hardware, firmware, or any combination thereof. For illustrative purposes, the following description of the discharge control process 400 may refer to elements mentioned above in connection with FIGS. 1-3. In practice, portions of the discharge control process 400 may be performed by different elements of the described system. It should be appreciated that the discharge control process 400 may include any number of additional or alternative tasks, the tasks shown in FIG. 4 need not be performed in the illustrated order, and the discharge control process 400 may be incorporated into a more comprehensive procedure or process having additional functionality not described in detail herein.

Referring to FIGS. 3 and 4, the vehicle protection system may operate in an idle state, during which the discharge circuit is inactive (task 402). The system controller may be configured to provide a discharge signal to the discharge controller to activate or trigger the discharge circuit. The system controller may provide a discharge signal upon an occurrence of a specified event (i.e., the automobile is keyed off, the power inverter assembly is opened, a unit containing a capacitor bank is accessed, etc.). The vehicle protection system may remain idle until receiving a signal indicating the high-voltage bus should be discharged (i.e., a discharge signal).

In an exemplary embodiment, in response to receiving a discharge signal, the discharge controller may be configured to wait for a period of time in order to filter out any possible noise or error that could cause a false discharge signal (i.e., electromagnetic interference, false command, etc.) (task 404). The delay is optional as will be appreciated in the art. In an exemplary embodiment, if the discharge signal is not present after the delay (e.g., Discharge=False), the discharge controller may determine the signal was erroneous and return to the idle state. If the discharge signal remains present (e.g., Discharge=True), the discharge controller may obtain a first voltage level of the high-voltage bus (task 406).

In an exemplary embodiment, the discharge controller may obtain a first voltage level of the high-voltage bus ($V_i$) (task 406). This may be done, for example, by using an analog-to-digital converter (A/D or ADC) provided as a feature of the discharge controller. As shown in FIG. 3, a voltage divider circuit may be utilized to scale down or reduce the analog voltage at the discharge controller input to a suitable level that is compatible with the operating range of the discharge controller. The discharge controller may be configured to activate the discharge circuit, causing current to flow from the high-voltage bus through the discharge circuit (i.e., by switching on the switching element in the discharge circuit) (task 408).

In accordance with one embodiment, the discharge controller may be configured to determine a discharge time ($t_\delta$) based on the first voltage level ($V_i$) of the high-voltage bus (task 410). In an exemplary embodiment, the discharge time is chosen as the minimum amount of time necessary to determine whether the high-voltage bus is properly discharging. The minimum amount of time necessary to determine whether the high-voltage bus is properly discharging may be calculated based on known or measurable parameters of the vehicle protection system.

In an exemplary embodiment, the discharge time may be determined based on the operating characteristics of the discharge circuit coupled to the high-voltage bus. The discharge circuit may be represented as an RC circuit. By virtue of this relationship, the discharge time for a given voltage level may be determined based on the relationship $$t_\delta = -RC \ln\left(1 - \frac{V_\delta}{V_i}\right),$$

wherein $V_\delta$ is a threshold value, $V_i$ is the first voltage level, and RC is a constant representing an operating characteristic of the discharge circuit.

In an exemplary embodiment, the threshold value ($V_\delta$) representing the smallest change in voltage level measurable by the discharge controller (i.e., the associated analog-to-digital converter) with reasonable accuracy may be chosen. In an exemplary case, the threshold value may be calculated using the equation $$V_\delta = (B_{error} + B_{threshold})\left(\frac{V_{ref}}{2^n}\right),$$

where $B_{error}$ is the number of bits of error introduced through analog-to-digital conversion (A/D) and/or quantization, $B_{threshold}$ is the decimal conversion of the binary representation of a desired voltage change in a high-voltage bus, $V_{ref}$ is the reference voltage level of the analog-to-digital converter, and n is the number of resolution bits associated with the analog-to-digital converter.

The discharge time ($t_\delta$) for a given voltage level may be determined at run-time or it may be pre-calculated. In accordance with one embodiment, a plurality of discharge times may be predetermined and calculated for a range of possible voltage levels of the high-voltage bus and stored in a lookup table or database coupled to or incorporated in the discharge controller. For example, in the case of an 8-bit A/D microcontroller (i.e., n=8), there are 256 possible voltage levels the discharge controller can resolve. Therefore, 256 different corresponding $t_\delta$ values for a plurality of possible voltage levels may be calculated and stored in a lookup table, database, etc. coupled to the discharge controller.

Figure 5:
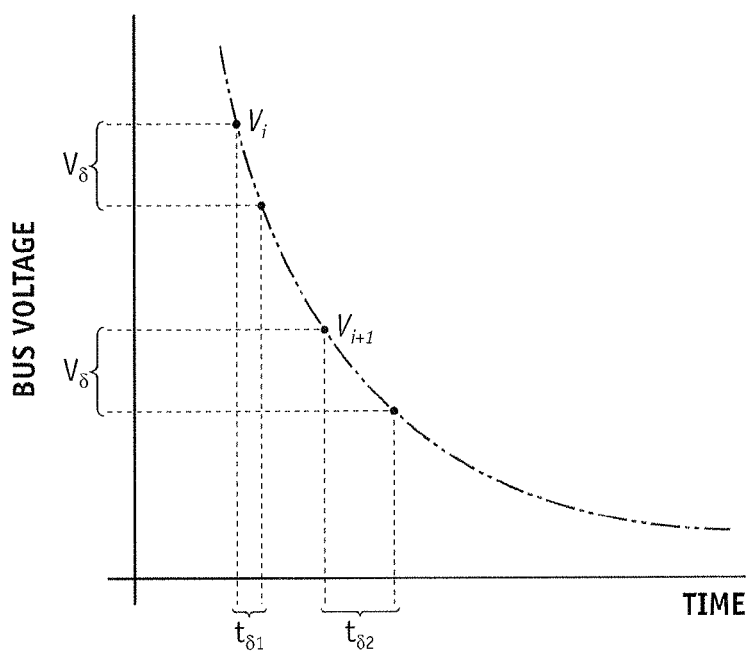
FIG. 5 is a graph of bus voltage versus time associated with the discharge of a high-voltage bus in an exemplary embodiment.

FIG. 5 shows the relationship between $V_\delta$, $t_\delta$, and the voltage level of the high-voltage bus. In an exemplary embodiment, for each $t_\delta$, the energy dissipated by the discharge circuit is essentially equal. For example, as shown, at a first voltage level $V_i$, the length of time $t_{\delta 1}$ required to dissipate a certain amount of energy (proportionally related to $V_\delta$) is noticeably less than the amount of time $t_{\delta 2}$ in which approximately the same amount of energy is dissipated at a lower initial voltage level ($V_{i+1}$).

Referring back to FIG. 4, in an exemplary embodiment, the discharge controller may be configured to obtain a second voltage level of the high-voltage bus ($V_{i+1}$) after the first discharge time ($t_\delta$) has elapsed ($V_i$) (task 412). The discharge controller may determine whether a difference between the first voltage level and the next voltage level is less than the threshold value (task 414). If the difference between the first voltage level and the second voltage level is greater than or equal to the threshold value (i.e., $V_i - V_{i+1} \geq V_\delta$), then the high-voltage bus is properly discharging. If the high-voltage bus is properly discharging, the process of determining a discharge time and determining if the high-voltage bus is properly discharging repeats for the second voltage level (i.e., $V_{i+1} \Rightarrow V_i$) (tasks 410, 412, 414, 416). The process may repeat until the voltage level of the high-voltage bus reaches zero or is essentially negligible.

However, if the difference between the first voltage level and the second voltage level is less than the threshold value, the high-voltage bus is not properly discharging. This may indicate a possible a fault condition (i.e., high-voltage bus contactors are connected, a constant energy source is applied to the high-voltage bus, etc.). In order to protect the components of the vehicle protection system and prevent the discharge circuit from overheating, the discharge controller may be configured to deactivate the discharge circuit (task 418). In an exemplary embodiment, the discharge controller may be configured to wait for a recovery time, before returning to the idle state (task 420). The recovery time is based on the average power handling capacity of the resistive element in the discharge circuit and prevents the discharge controller from possibly reactivating the discharge circuit too soon, which could cause the average power dissipation by the resistive element to exceed its power rating. In an exemplary embodiment, after the recovery time, the discharge controller may return to an idle state, and reactivate the discharge circuit in response to a discharge signal (tasks 402, 404, 406, 408).

One advantage of the system and/or method described above is that the vehicle protection system 42 maintains constant energy dissipation per discharge time interval while still providing protection in case of a fault condition, allowing the system designer to optimize components for normal operation (i.e., by using high-energy pulse resistors which are a fraction of the size of other resistors with better average power characteristics). Furthermore, because the discharge time is smaller at higher voltage levels, the recovery time during a fault condition can be substantially reduced. The discharge time is increased as the high-voltage bus discharges, which improves A/D resolution and accuracy at lower voltage levels. Other embodiments may utilize the systems and methods described above in different types of automobiles, different vehicles (e.g., watercraft and aircraft), or in different electrical systems altogether, as it may be implemented in any situation where a high-voltage bus needs to be reliably discharged.

For the sake of brevity, conventional techniques related to signal processing, signaling, switch control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling a discharge circuit coupled to a high-voltage bus, wherein the discharge circuit is activated such that current flows from the high-voltage bus through the discharge circuit, the method comprising:
   determining a first discharge time based on a first voltage level of the high-voltage bus;
   obtaining a second voltage level of the high-voltage bus after the first discharge time; and
   deactivating the discharge circuit if a difference between the first voltage level and the second voltage level is less than a threshold value.

2. The method of claim 1, further comprising:
   if the difference between the first voltage level and the second voltage level is less than the threshold value:
   waiting for a recovery time thereafter; and
   reactivating the discharge circuit in response to a signal indicating the high-voltage bus should be discharged.

3. The method of claim 2, wherein the recovery time is based on an average power handling capacity of the discharge circuit.

4. The method of claim 1, further comprising:
   determining a second discharge time based on the second voltage level;
   obtaining a third voltage level of the high-voltage bus after the second discharge time; and
   deactivating the discharge circuit if a difference between the second voltage level and the third voltage level is less than the threshold value.

5. The method of claim 1, further comprising:
   for a plurality of possible voltage levels of the high-voltage bus:
   calculating a plurality of discharge times for each of the plurality of possible voltage levels; and
   storing the plurality of discharge times in a lookup table associated with each of the plurality of possible voltage levels, wherein determining the first discharge time further comprises obtaining the first discharge time from the lookup table based on the first voltage level.

6. The method of claim 1, wherein the first discharge time is governed by $$t_\delta = -RC\ln\left(1 - \frac{V_\delta}{V_i}\right),$$

wherein $t_\delta$ is the first discharge time, $V_\delta$ is the threshold value, $V_i$ is the first voltage level, and RC is a constant based on an operating characteristic of the discharge circuit.

7. The method of claim 1, wherein the threshold value is based on a smallest measurable change in a voltage level of the high-voltage bus.

8. A method for discharging a high-voltage bus coupled to a discharge circuit, the method comprising:
   obtaining a first voltage level of the high-voltage bus;
   determining a first discharge time based on the first voltage level;
   activating the discharge circuit for the first discharge time;
   obtaining a second voltage level of the high-voltage bus after the first discharge time;
   comparing the first voltage level and the second voltage level; and
   deactivating the discharge circuit if a difference between the first voltage level and the second voltage level is less than a threshold value.

9. The method of claim 8, further comprising if the difference between the first voltage level and the second voltage level is less than the threshold value, reactivating the discharge circuit after a recovery time in response to a signal indicating the high-voltage bus should be discharged.

10. The method of claim 8, further comprising:
determining a second discharge time based on the second voltage level;
obtaining a third voltage level of the high-voltage bus after the second discharge time; and
deactivating the discharge circuit if a difference between the second voltage level and the third voltage level is less than the threshold value.

11. The method of claim 8, further comprising:
for a plurality of possible voltage levels of the high-voltage bus:
calculating a plurality of discharge times for each of the plurality of possible voltage levels; and
storing the plurality of discharge times in a lookup table associated with each of the plurality of possible voltage levels; and
obtaining the first discharge time from the lookup table based on the first voltage level.

12. The method of claim 8, wherein the first discharge time is governed by $$t_\delta = -RC\ln\left(1 - \frac{V_\delta}{V_i}\right),$$

wherein $t_{67}$ is the first discharge time, $V_\delta$ is the threshold value, $V_i$ is the first voltage level, and RC is a constant based on an operating characteristic of the discharge circuit.

13. The method of claim 12, wherein $V_{67}$ is governed by $$V_\delta = (B_{error} + B_{threshold})\left(\frac{V_{ref}}{2^n}\right),$$

wherein $B_{error}$ is a number of bits of error introduced through analog-to-digital conversion, $B_{threshold}$ is a decimal conversion of a binary representation of a desired voltage change in the high-voltage bus, $V_{ref}$ is a reference voltage level of an analog-to-digital converter, and n is a number of resolution bits associated with the analog-to-digital converter.

14. A vehicle protection system for a high-voltage capacitor bank coupled to a high-voltage bus, the vehicle protection system comprising:
a discharge circuit coupled to the high-voltage bus; and
a discharge controller coupled to the high-voltage bus and the discharge circuit, the discharge controller being configured to:
activate the discharge circuit;
determine a first discharge time based on a first voltage level of the high-voltage bus;
obtain a second voltage level of the high-voltage bus after the first discharge time; and
deactivate the discharge circuit if a difference between the first voltage level and the second voltage level of the high-voltage bus is less than a threshold value.

15. The vehicle protection system of claim 14, the discharge controller further comprising an analog to digital converter, wherein the threshold value is a smallest change in a voltage level measurable by the analog to digital converter.

16. The vehicle protection system of claim 14, wherein the discharge circuit comprises:
a switch coupled to the high-voltage bus and the discharge controller; and
a pulse resistor coupled to the switch and a ground.

17. The vehicle protection system of claim 16, wherein the discharge controller is configured to deactivate the switch for a recovery time based on an average power handling capacity of the pulse resistor if the difference between the first voltage level and the second voltage level is less than the threshold value.

18. The vehicle protection system of claim 14, further comprising a lookup table coupled to the discharge controller, the lookup table containing a plurality of discharge times associated with a plurality of possible voltage levels of the high-voltage bus, the discharge controller being configured to obtain the first discharge time from the lookup table based on the first voltage level.

19. The method of claim 1, further comprising activating the discharge circuit, wherein obtaining the second voltage level comprises obtaining a voltage of the high voltage bus the first discharge time after activating the discharge circuit.

20. The vehicle protection system of claim 14, wherein the discharge circuit is activated for the first discharge time.

* * * * *